C. BORG.
INDEXING DEVICE FOR WHEEL MACHINES.
APPLICATION FILED NOV. 6, 1907.
921,071.
Patented May 11, 1909.
3 SHEETS—SHEET 2.
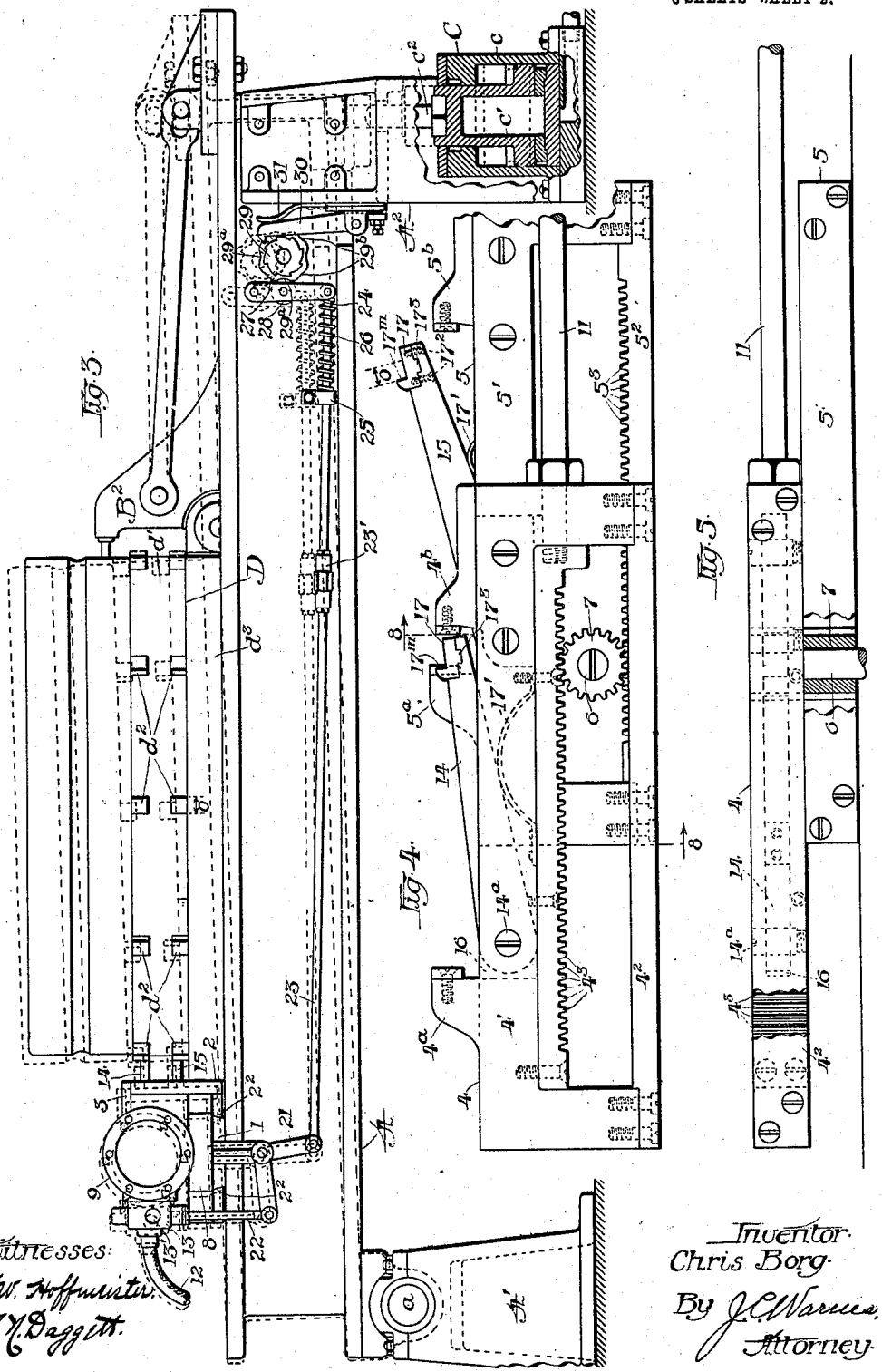
Witnesses
F.W. Hoffmeister
T.N. Daggett
Inventor
Chris Borg
By J.C. Warner,
Attorney

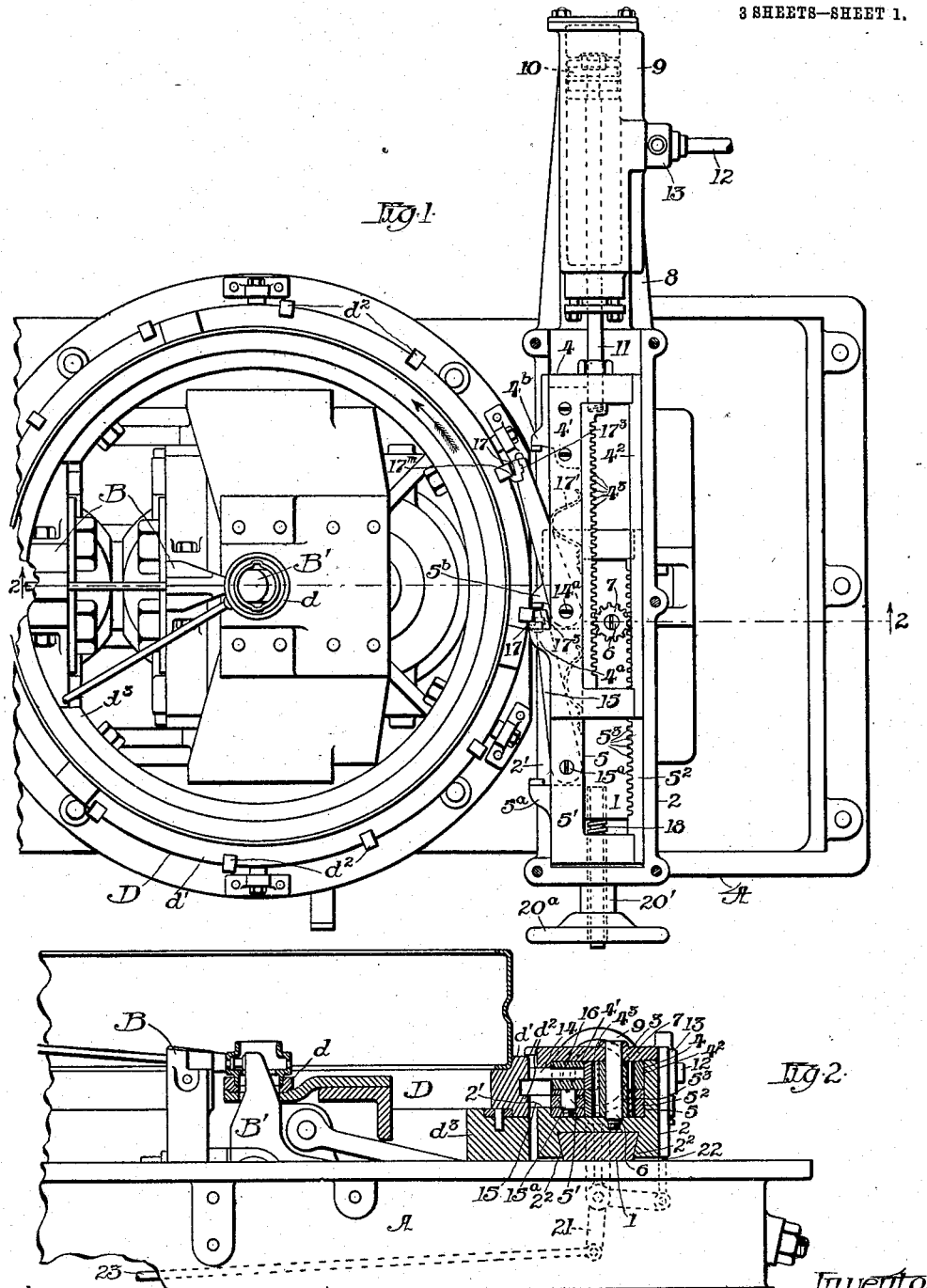

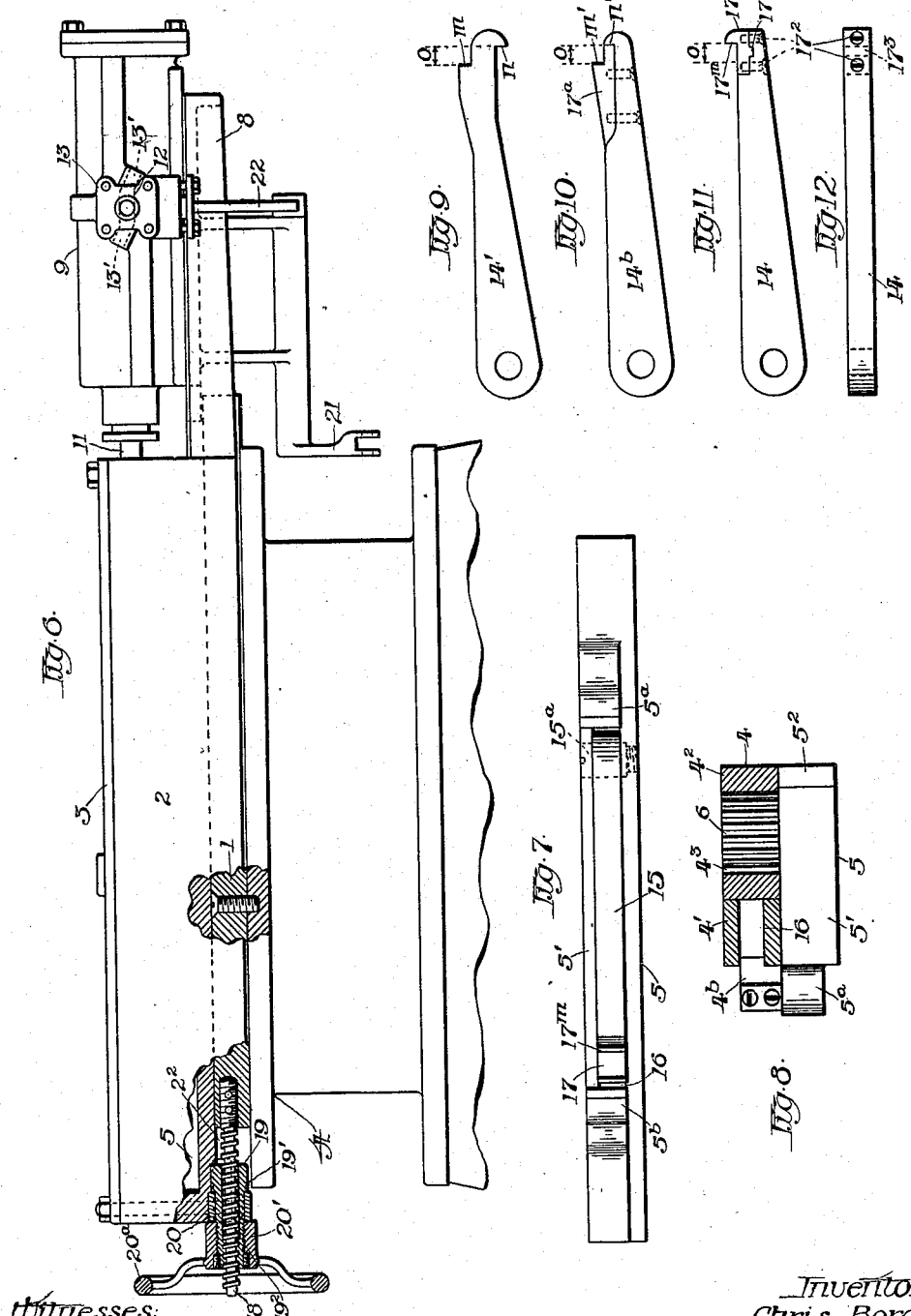

UNITED STATES PATENT OFFICE.

CHRIS BORG, OF CHICAGO, ILLINOIS.

INDEXING DEVICE FOR WHEEL-MACHINES.

No. 921,071.          Specification of Letters Patent.          Patented May 11, 1909.

Application filed November 6, 1907. Serial No. 401,029.

*To all whom it may concern:*

Be it known that I, CHRIS BORG, a citizen of the United States, residing at Chicago, in the county of Cook and State of Illinois, have invented a new and useful Improvement in an Indexing Device for Wheel-Machines, of which the following is a complete specification.

This invention relates to means for rotating the wheel member support to proper position as the spokes are successively secured in place, and its application is made to a machine for manufacturing metal wheels, the machine being of the type shown in Patent No. 807,539, which issued to me December 19, 1905.

The object in view is to provide a simple and effective device, automatic in its operation, for turning the wheel member support to a position in which the spoke receiving apertures of the hub and rim will be caused to register with the position of the spoke when in the stationary spoke gripping jaws.

Another feature of the improvement—the reversible and double acting feature—consists in the novel construction which will enable it to move the wheel member support in either direction, and to make the movement of its plunger effective in both its forward and return stroke.

Referring to the accompanying drawings—Figure 1 represents a plan of the wheel supporting end of the table of a wheel machine of the type before mentioned and in connection with which my improvement is shown. Fig. 2 is a longitudinal section of same taken on the line 2—2 of Fig. 1. Fig. 3 shows a side elevation of the principal parts of a wheel machine and indexing device attached thereto, and is designed to illustrate the construction and operation of the valve controlling mechanism for the indexing device. Fig. 4 is an enlarged detail plan of the reciprocating racks on which are mounted the ring actuating dogs. Fig. 5 represents a side elevation of the parts shown in the preceding figure. Fig. 6 is an elevation of that end of the wheel machine on which the indexing device is mounted, and is designed to illustrate the manner of effecting the bodily adjustment of said device. Fig. 7 is a detail elevation of the lower reciprocating rack, the view showing the side adjacent to the tire ring of the wheel member support. Fig. 8 represents a transverse section of the two racks, the view being taken as indicated by the line 8—8 in Fig. 4; and Figs. 9 to 12, inclusive, are details of the actuating dog and two modified forms thereof.

In the drawings A designates the table or bed-plate of a wheel machine of the type above cited, $A^1$ and $A^2$ the rearward and forward pedestals, respectively, on which said bed-plate is mounted, B the jaws of the relatively stationary spoke fastening devices operating inside the wheel rim, $B^2$ the upsetting head of the spoke fastening devices operating outside the rim, and $B^1$ the upsetting head operating inside the hub. The spoke fastening devices are mounted independently of the bed-plate A and hence are stationary relative thereto. The end of the bed-plate A is supported upon the rearward pedestal $A^1$ through the shaft $a$, which forms a pivotal bearing between these parts; while the other or forward end of said bed-plate rests upon the forward pedestal $A^2$ and is adapted to be raised therefrom by means of the pneumatic lift C. This lift is comprised essentially of the cylinder $c$, the plunger $c^1$ operating therein, and the connecting rod $c^2$, which suitably engages the end of said bed-plate A. On top of the bed-plate, adjacent to the pivotal end thereof, is mounted the wheel member support D; or, more accurately, the hub and rim support, since the spoke is held by the spoke fastening devices, comprising the jaws B, and the in and outside heading tools $B^1$ and $B^2$. This wheel member support is comprised of the hub support $d$ and the tire ring support $d^1$. The ring $d^1$ is rotatively mounted upon the fixed base ring $d^3$ on the bed plate A, and is provided with the pawl engaging lugs $d^2$, corresponding in number with the number of spokes in each series of spokes in the wheel. The parts thus far described are substantially the same as set forth in the patent to which reference has already been made, and hence a detailed description thereof is here believed to be unnecessary.

It will be apparent from an inspection of the machine of my patent that in the operation thereof the operator is obliged to turn the tire support and wheel tire therein to proper position in securing in place the successive spokes, and it is the purpose of the present improvement to render such action automatic. To this end an automatic indexing device is mounted on the bed-plate A, adjacent and tangentially to the ring $d^1$, in position to engage the lugs $d^2$ thereof and intermittently rotate same a definite amount.

This indexing device is constructed as follows: On the bed-plate A is fixed, by means of bolts or otherwise, a guide 1, which dovetails into the bottom of the rack frame 2. The rack frame 2 is of a hollow rectangular shape, open above and open also, as shown at $2^1$ in Fig. 1, on the side adjacent to the wheel rim support. The depending cheeks $2^2$ on each side of the frame form the dovetailed way in which fits the said guide, while over the top is bolted the cover plate 3. In Fig. 1 this cover plate is shown removed. Within the rack frame 2 are placed the two superposed reciprocating toothed racks, the upper rack being designated by the numeral 4, and the lower one by 5. The lower one of these racks bears against the bottom and walls of the frame 2, while the upper one slides upon the lower one within said frame. Each rack 4 and 5 consists of a U-shaped body portion $4^1$ and $5^1$, with a connecting bar $4^2$ and $5^2$, respectively, extending along the outer side thereof and connecting the ends of the legs on said body portion, thereby leaving the racks open in the middle. The slots thus formed extend longitudinally of the inclosing frame. On the inside of the slot in the rack 4 is formed the rack teeth $4^3$; while on the bar $5^2$, outside the slot in the rack 5, is formed the series of rack teeth $5^3$. In the frame 2 and cover 3, midway of the length thereof, is fixed the vertical pin 6, which forms a journal bearing for the pinion 7. The said pinion 7 in length equals the thickness of the two racks 4 and 5, and is adapted to engage on its opposite sides the series of teeth $4^3$ and $5^3$ of said racks, so that movement of the pinion will impart longitudinal movement to the racks but in opposite directions.

On the rack frame 2, and formed preferably integral therewith, is a rearward extension 8 (see Figs. 1 and 6), on which is mounted a cylinder 9. A piston 10, shown in dotted lines in Fig. 1, operates in this cylinder and connects with the upper rack 4 by means of the connecting rod 11. The cylinder 9 is closed at both ends, hence the piston is double acting, and it is evident that movement of the piston 10 will effect a corresponding movement of the upper rack in the same direction as the said piston moves, and of the lower rack 5 in an opposite direction. Air is supplied to the cylinder 9 through the supply pipe 12, and its admission is controlled by means of suitable valve mechanism (not shown) in the valve chest 13, the exhaust air escaping through the ports $13^1$ in the valve chest, as shown in Fig. 6. The manner of automatically actuating the air admission valves and the mechanism relating thereto will be hereinafter considered.

In order to impart movement to the tire supporting ring $d^1$ from the reciprocating racks 4 and 5, the pawls 14 and 15, respectively, are pivotally mounted thereon, the pivotal axes thereof being formed, respectively, by the pins $14^a$ and $15^a$. To provide a bearing for both ends of the pivotal axes $14^a$ and $15^a$, and to render the construction more compact, slots 16 are provided in the body portions $4^1$ and $5^1$ of the racks 4 and 5, for the reception of said pawls 14 and 15. These pawls are made to project from the racks 4 and 5 obliquely and inwardly, and extend in the same direction in such a manner as to enable them to engage with their head 17 the lugs $d^2$ on the tire ring support $d^1$. The springs $17^1$, which are secured to the racks 4 and 5, are so situated in the slots 16 as to bear against the pawls 14 and 15 and hold them yieldingly in position to engage said lugs $d^2$ but yet enable them to swing away from them as they slide over the adjacent lug in their return movement.

In Figs. 1 and 4 the preferred form of pawl and pawl head 17 is illustrated, this head being reversible and provided with the lug engaging shoulder $17^m$. As shown in these figures, the said head is set to move the tire supporting ring $d^1$ in the direction indicated by the arrow in Fig. 1, but if reversed, as shown in detail in Fig. 11, the said ring $d^1$ will be moved in a reverse direction. In the first instance the pawls 14 and 15 will advance the tire ring by pushing, but in the latter instance by pulling. It is well understood that in securing the spokes of a wheel to the rim and hub thereof in a wheel having two series of spokes (one series at each end of the hub), in consequence of the spokes shortening in cooling, there is a tendency to pull the hub to a slightly eccentric position with respect to the rim. If the indexing device were made to advance the tire ring in the same direction in securing both series, the result would be a drawing of the hub to a position in which its axis would be slightly inclined to the plane of the rim, but if the spokes are introduced in the same order in the second series and in the same direction, then the axis of the hub will be kept perpendicular to the plane of the rim. This explains the necessity for providing a reversible indexing device. The reversible head 17 is secured to the pawls by means of the screws $17^2$, a shoulder $17^3$ and corresponding mortise being provided in the two members to secure the head against endwise movement. The distance between the engaging surface $17^m$ of the head 17 in its two different positions is just equal to the thickness of the lugs $d^2$ on the ring $d^1$, so that the same movement of the racks 4 and 5 will produce the same movement of the ring in either direction. This distance is indicated by the line o in Figs. 3, 4, 9, 10 and 11.

In Fig. 9 is shown a modified form of pawl 14¹, the lug engaging shoulders $m$ and $n$ being formed on opposite sides of the end thereof, and hence when it is desired to reverse the direction of movement of the tire ring the said pawl is removed and again put in place with the other side toward the said ring.

In Fig. 10 is shown another alternative form of pawl 14ᵇ, in which the removable head 17ᵃ is provided with a lug engaging shoulder $m^1$, and when the head is removed the shoulder $n^1$ is exposed for engaging the lug $d^2$ and operating the tire ring in the reverse direction.

As the pawls 14 and 15 operate to advance the tire ring $d^1$ to position for the securement of the succeeding spoke, it becomes necessary to hold the parts firmly in place while the spoke is being secured to the other wheel members, and this is done by coöperating lugs on the racks 4 and 5. Near the ends of said racks, and on the pawl sides thereof, there are formed laterally projecting shoulders, on the rack 4 the shoulders 4ᵃ and 4ᵇ, and on the rack 5 the shoulders 5ᵃ and 5ᵇ. These shoulders are so arranged that they will abut the lugs $d^2$ on the tire ring $d^1$ when the racks are at the end of their stroke, the shoulders 4ᵇ and 5ᵃ engaging on opposite sides the said lug $d^2$ when the parts occupy the positions shown in Fig. 4. When the racks have moved to the opposite end of their stroke, then the shoulders 4ᵃ and 5ᵇ engage the lug, as shown in Fig. 1. These shoulders operate not only to hold the wheel member support stationary, but also serve as stops to limit the movement of said racks at the ends of their stroke. It is evident that if the pawls 14 and 15 are long enough to advance the tire ring $d^1$ an amount sufficient to enable the shoulder which approaches the lug $d^2$ from the rear (the shoulder 4ᵃ in Fig. 1) to engage said lug, then the coacting shoulders 4ᵃ, 5ᵇ and 4ᵇ, 5ᵃ will operate not only to hold the parts in a fixed position, but will also center the ring $d^1$ and wheel members thereon in a definite predetermined position.

If the spoke receiving apertures in the wheel members were always uniform and corresponded exactly with the lugs $d^2$ on the tire ring $d^1$, the pawls 14 and 15 and shoulders 4ᵃ, 4ᵇ and 5ᵃ, 5ᵇ on the racks would always bring the wheel members to proper position; that is, to a position in which the spoke would aline with the stationary spoke fastening devices. Such uniformity does not prevail, however, and hence it becomes necessary to adjust the indexing devices bodily, which is done by the following described mechanism: In the guide 1, at its front end, is fixed a threaded rod 18 (see Fig. 6) which projects forwardly beyond the end of the rack frame 2. This rod engages a correspondingly threaded sleeve 19, which is held longitudinally fixed with respect to the frame 2 within the bushing 20. This bushing is secured to the frame by any suitable means (not shown). The shoulder 19¹ on the sleeve 19 bears against the inside of said bushing, while the collar 20¹ of the hand wheel 20ᵃ, by bearing against the outside of said bushing, prevents movement of same in the opposite direction. The collar 20¹ of said hand wheel is received by the threaded portion 19² of the sleeve 19 and is keyed or otherwise secured thereto, so that rotation of the hand wheel 20ᵃ on the fixed threaded rod 18 will impart longitudinal movement to the frame 2 and thereby effect proper adjustment of the wheel supporting members through the pawls with respect to the spoke fastening devices.

It is evident that the indexing devices must be actuated once each time a spoke is secured in place, and the means for controlling the admission of air will now be described: As formerly stated, the right-hand end of the table A, as viewed in Fig. 3, will be raised and lowered by the admission and escape of air to and from the cylinder $c$, said admission and escape being effected by means under the control of the operator. The table carries the rim and hub supports, and as it is raised and lowered, will move the spoke, rim and hub to and from an operative position with respect to the spoke fastening devices, and this movement of the table is employed to automatically control the operation of the indexing device. A bell crank 21 is pivotally mounted on the bed-plate A, the horizontal arm thereof engaging the valve rod 22; while the vertical arm engages the long rod 23, which extends to the forward end of said bed-plate, the forward end of said rod connecting with the lower end of the pendent arm 24. The said rod 23 engages near its forward end the fixed collar 25, between which and the end of the rod is interposed the coil spring 26, this spring operating to hold the rod forward and the bell crank 21 normally in the full line position shown in Fig. 3. The turn-buckle 23¹ in rod 23 permits of adjustment in length of said rod. On the bed-plate A, adjacent to the arm 24, is mounted a cam wheel 27 adapted to engage a cam roller 28 mounted on the pendent arm 24. A ratchet wheel 29 is mounted on the same bearing with the cam wheel 27 and is in effect one piece therewith. A ratchet pawl 30 is pivotally mounted on the pedestal A² in a position to engage the ratchet wheel 29 as the table A is raised and lowered, the spring 31 holding said ratchet pawl in engagement with the ratchet wheel. The cam wheel 29 is provided with alternate roller-actuating surfaces $29^a$ and $29^b$, of different distances from the center, in order to secure a different throw of bell crank 21 and hence admit air to alternate sides of the piston.

The operation of this valve actuating mechanism is as follows: Assuming the bed-plate A in its lower or operative position, as indicated by the full line in Fig. 3, the roller 28 will be seen to be resting on the lower cam surface $29^a$, thus permitting the spring 26 to hold the bell crank 21 in the full line position shown, depressing the valve rod 22 and admitting air to one end—the forward end, for instance—of the cylinder. When the pneumatic lift C is caused to elevate the bed-plate A, moving it to the dotted line position of Fig. 3, and carrying the cam and ratchet wheels with it, the ratchet wheel 27 will engage the pawl 30 and be turned with the cam wheel one notch, thereby causing the roller 28 to ride onto a higher cam surface and force the bell crank 21 to its dotted line position, raising the valve rod 22 and admitting air to the rear end of the cylinder 9.

The operation of the indexing device is as follows: Assuming the wheel members to be properly placed in the wheel member support D, on the bed-plate A, and the spoke fastening devices to have completed their movement in securing the last spoke, the parts will then occupy the position shown in full lines in Fig. 3. The forward end of the bed-plate is then raised about its pivotal axis $a$ by the pneumatic lift C until the bed-plate and parts thereon occupy the position shown by dotted lines in the same figure. In this movement the cam wheel 27 will be rotated one notch by means of the pawl 30 and ratchet 29, thereby, through the pendent arm 24, the roller 28, the long rod 23 and the bell crank 21, actuating the valve mechanism which admits air to the cylinder 9. If the air has been admitted to the left-hand side of the piston, which is shown in dotted lines in Fig. 1, the piston will move to the right-hand end of the cylinder 9, as shown, pulling the upper rack 4 with it to the right, and simultaneously, through the pinion 7, moving the lower rack 5 to the left, so that, at the end of this movement, the racks will occupy the position indicated in Fig. 1. This movement is limited by the shoulder $4^a$ on the upper rack 4 and the shoulder $5^b$ on the lower rack 5 impinging the opposite sides of the lug $d^2$ on the tire ring $d^1$. If the two shoulders $4^a$ and $5^b$ do not contact the sides of the lug simultaneously, then, unless the pawls 14 and 15 are too long, the said shoulders will operate to center the tire ring support $d$ and cause the spoke which has previously been inserted in the spoke receiving apertures of the rim and hub to register with the stationary jaws of the spoke fastening devices. In the movement last described the pawl 14 on the upper rack 4 operates to engage the lug $d^2$ and advance the tire ring $d^1$; while the pawl 15 on the lower rack 5 is retracted by the movement in the opposite direction of the lower rack 5 and is brought to position to engage the next lug $d^2$ on the succeeding stroke of the piston. In this manner the device is made double acting; that is, a stroke of the piston in either direction operates to advance the tire ring without the parts returning to position for a working stroke. If the device were only single acting, then every alternate charge of air would be wasted in returning the parts to position to start their next working stroke, and hence double the amount of air would be required to operate the device.

If, because of slight variations or inaccuracies in the spoke receiving apertures of the hub and rim, the spoke which was last inserted and not yet secured, does not register with the jaws after the racks 4 and 5 have completed their movement, the indexing device is adjusted bodily, as before described, by means of the hand wheel 28. By adjusting the device bodily, the shoulders $4^a$ and $5^b$, or at the other end of its movement $4^b$ and $5^a$, will be made to bear tightly against the side of the lug $d^2$ and hold the rim support in place through the air pressure against the piston 10. Such bodily adjustment is not ordinarily necessary. After the spoke which is about to be secured to the rim and hub has been brought to a position vertically coincident with the spoke fastening jaws B, the operator causes the bed-plate A to drop in order to bring the spoke to a position where it can be gripped by the jaws. In this movement the ratchet wheel 29 will drop from the dotted to the full line position in Fig. 3, the pawl 30 yielding in such movement. After the spoke has been secured in place the pneumatic lift C is again made to raise the bed-plate, which will automatically actuate the indexing device again, advancing the tire ring to position for the next spoke, and the operation thus continues.

In the patent to which reference has been made the table is shown to be stationary and the spoke fastening devices raised and lowered to the spoke. This does not affect the principle of the operation, however, since the valve actuating mechanism on the indexing device could be controlled by the movement of the spoke fastening devices equally as well as by the movement of the bed-plate, upon which is placed the wheel member supports.

What I claim as my invention, and desire to secure by Letters Patent, is:

1. In a wheel machine, and in combination with the wheel rim support thereof, an automatic and reversible indexing device adapted to impart a definite angular movement to said wheel rim support, substantially as and for the purpose specified.

2. In a wheel machine, and in combination with the wheel rim support thereof, a bodily adjustable indexing device adapted to impart a definite angular movement to said wheel rim support, substantially as and for the purpose specified.

3. In a wheel machine, and in combination with the wheel rim support thereof, a double acting and reversible indexing device adapted to impart a definite angular movement to the wheel rim support thereof, substantially as and for the purpose specified.

4. In a wheel machine, in combination, a bed-plate, a wheel rim and hub support mounted thereon, spoke fastening devices, means for raising and lowering said bed-plate to and from an operative position with respect to said spoke fastening devices, an indexing device adapted to impart a definite angular movement to the wheel rim support, and means actuated by the raising and lowering of the bed-plate for controlling the movement of said indexing device.

5. In a wheel machine, in combination, a bed-plate, a wheel rim and hub support mounted thereon, spoke fastening devices, means for raising and lowering said bed-plate to and from an operative position with respect to said spoke fastening devices, an indexing device adapted to impart a definite angular movement to the rim support, and controlling mechanism for the indexing device comprising a ratchet and cam wheel mounted on the bed-plate, a pawl mounted on a stationary portion of the machine, and an operative connection extending between said cam wheel and indexing device, substantially as and for the purpose specified.

6. In a wheel machine, and in combination with the wheel rim support thereof, an automatic indexing device comprising mechanism for imparting a definite angular movement to said wheel rim support, and stops to limit the movement of said mechanism, substantially as and for the purpose specified.

7. In a wheel machine, and in combination with the wheel rim support thereof, an automatic indexing device comprising mechanism for imparting a definite angular movement to said wheel rim support, and single means serving both as stops to limit the movement of said mechanism and also operating to center and retain in a fixed position the said wheel rim support, substantially as and for the purpose specified.

8. In a wheel machine, and in combination with the wheel rim support thereof, an indexing device comprising two longitudinally reciprocating, toothed racks, means for simultaneously imparting movement to both racks in opposite directions, and a pawl mounted on each rack and adapted to alternately engage and advance the said wheel rim support, substantially as and for the purpose specified.

9. In a wheel machine, and in combination with the rim support thereof, an indexing device comprising two longitudinally reciprocating, toothed racks, single means for imparting simultaneous movement to both racks, and a pawl mounted on each rack and adapted to alternately engage the said wheel rim support and impart a definite angular movement thereto, substantially as and for the purpose specified.

10. In a wheel machine, in combination, a wheel rim support, lugs formed on the periphery thereof, and an indexing device for intermittently advancing said wheel rim support for the securement of the successive spokes to the wheel members, said device comprising a rack frame, two superposed toothed racks operating therein, a reversibly acting pawl mounted on each of said racks and adapted to engage the lugs on said wheel rim support, coacting shoulders formed on said racks and adapted to also engage the said lugs, thereby centering and holding the said support fixed, and means for imparting simultaneous movement in opposite directions to both racks, substantially as and for the purpose specified.

11. In a wheel machine, in combination, a wheel rim support, lugs formed on the periphery thereof, and an indexing device for intermittently advancing said wheel rim support for the securement of the successive spokes to the wheel members, said device comprising a bodily adjustable rack frame, two superposed slotted, toothed racks operating therein, a pawl mounted on each of said racks and adapted to engage the lugs on said wheel rim support, a shoulder formed on each end of each rack, the shoulder on the end of one rack coacting with the shoulder on the opposite end of the other rack to engage the successive lugs on said wheel rim support to center and hold same, and means for imparting simultaneous movement in opposite directions to said racks, substantially as and for the purpose specified.

12. In a wheel machine, in combination, a bed-plate, a tire ring rotatably mounted thereon with lugs formed on the periphery thereof, a guide fixed on said bed-plate, a rack frame slidably mounted on said guide, means for adjusting the position of the frame upon the guide, two superposed reciprocating racks mounted in said frame and provided with longitudinally extending slots, each rack having a series of rack teeth formed on one side of the slot thereof, the teeth of the slot in the lower rack lying on the side opposite to those in the upper rack, a pinion mounted in said rack frame within the slots of said racks and adapted to engage with its opposite sides the teeth along the sides of the slots, a pawl provided with a reversible head and mounted on each of said racks and adapted to engage the lugs on said wheel rim support, coacting shoulders formed on said racks and arranged to engage the said lugs, thereby centering and holding the said tire ring fixed, a cylinder and piston with suitable connection with one of said racks for imparting a reciprocating motion thereto, and a cam having a pawl and ratchet mechanism operated by a moving part of the machine, for controlling the admission of air to said cylinder, substantially as and for the purpose specified.

CHRIS BORG.

Witnesses:
CARL E. KIBBIE,
O. A. ANDERSON.